(12) United States Patent
Katsuda et al.

(10) Patent No.: US 8,225,719 B2
(45) Date of Patent: Jul. 24, 2012

(54) GAS GENERATOR

(75) Inventors: Nobuyuki Katsuda, Hyogo (JP); Mikio Yabuta, Hyogo (JP)

(73) Assignee: Daicel Chemical Industries, Ltd., Osaka (JP)

( * ) Notice: Subject to any disclaimer, the term of this patent is extended or adjusted under 35 U.S.C. 154(b) by 60 days.

(21) Appl. No.: 12/765,168

(22) Filed: Apr. 22, 2010

(65) Prior Publication Data

US 2010/0269727 A1 Oct. 28, 2010

Related U.S. Application Data

(60) Provisional application No. 61/172,516, filed on Apr. 24, 2009.

(30) Foreign Application Priority Data

Apr. 23, 2009 (JP) ................................. 2009-104836

(51) Int. Cl.
*B60R 21/26* (2011.01)

(52) U.S. Cl. ......... 102/530; 280/736; 280/741; 280/742

(58) Field of Classification Search .................. 102/530, 102/531; 280/741, 742, 736, 740
See application file for complete search history.

(56) References Cited

U.S. PATENT DOCUMENTS

| 5,221,109 | A | * | 6/1993 | Marchant | 280/736 |
| 5,613,705 | A | * | 3/1997 | Hock et al. | 280/741 |
| 6,056,319 | A | | 5/2000 | Ruckdeschel et al. | |
| 6,206,417 | B1 | | 3/2001 | Soderquist et al. | |
| 6,692,021 | B2 | * | 2/2004 | Amamori | 280/739 |
| 6,820,556 | B1 | | 11/2004 | Oda | |
| 7,530,598 | B2 | | 5/2009 | Fischer et al. | |
| 2007/0248511 | A1 | | 10/2007 | Mason et al. | |

FOREIGN PATENT DOCUMENTS

| DE | 197 42 204 B4 | 3/1999 |
| DE | 20 2005 017 267 U1 | 3/2006 |
| JP | 4-50057 A | 2/1992 |
| JP | 2003-161599 A | 6/2003 |

* cited by examiner

*Primary Examiner* — James Bergin
(74) *Attorney, Agent, or Firm* — Birch, Stewart, Kolasch & Birch, LLP

(57) ABSTRACT

The present invention provides a gas generator for a restraining device of a vehicle, including:
a housing being made of a resin, forming an outer shell container, having a plurality of gas discharge ports,
an ignition device disposed inside the housing,
a gas generating agent that is ignited and burned by activation of the ignition device,
each of the gas discharge ports being formed in combination with each of a plurality of through holes of an annular plate member that is embedded in a circumferential wall surface of the housing and formed of a material selected from the group consisting of metals, ceramics, and carbon fiber, and
the annular plate member being formed of an annular base plate including the plurality of through holes formed therein.

3 Claims, 5 Drawing Sheets

(a)

(b)

(a)   (b)

ized portions. of each ofonlyhousing.sitionreducedare notFIELD OF INVENTION

GAS GENERATOR

This nonprovisional application claims priority under 35 U.S.C. §119(a) to Patent Application No. 2009-104836 filed in Japan on 23 Apr. 2009 and 35 U.S.C. §119(e) to U.S. Provisional Application No. 61/172,516 filed on 24 Apr. 2009, both of which are incorporated by reference.

FIELD OF INVENTION

The present invention relates to a gas generator for use in a restraining device of a vehicle.

BACKGROUND OF INVENTION

Since a gas generator is installed on a vehicle, it is desirable that the weight of the gas generator be as small as possible. For this purpose, some of the components constituting the gas generator are known to be formed of a resin. In particular, in a pyrotechnic gas generator in which a solid gas generating agent is accommodated inside a housing and a combustion gas is generated by combustion thereof, because high-temperature heat is generated by activation, heat resistance should be investigated when a resin is used.

JP-A No. 4-50057 discloses a gas generator using a resin in an outer container 16. In the inner space formed by the outer container made of synthetic resin, that is formed by a diffuser shell 30 and a base shell 32, an inner wall of a space (filter chamber) 52 where filter members 40, 42 are accommodated is provided with a metal coating 54 to prevent the resin from burning by the heat of generated gas.

In JP-A No. 4-50057, the combustion of resin is inhibited by using a heat-resistance material, but no measures are taken with respect to discharge ports 44, 46 where the gas flow velocity is the highest. The discharge ports 44, 46 are portions that discharge the combustion gas, and these portions are affected by high-velocity collisions with high-temperature gas and exposed to conditions more severe than the inner wall of the filter chamber during activation. Therefore, the resin constituting these portions is melted and damaged (referred to hereinbelow as "melting damage"), the opening surface area changes, and the output performance of the inflator itself changes in the course of activation.

SUMMARY OF THE INVENTION

Invention II provides a gas generator for a restraining device of a vehicle, including:
a housing being made of a resin, forming an outer shell container, having a plurality of gas discharge ports,
an ignition device disposed inside the housing,
a gas generating agent that is ignited and burned by activation of the ignition device,
each of the gas discharge ports being formed in combination with each of a plurality of through holes of an annular plate member that is embedded in a circumferential wall surface of the housing and formed of a material selected from the group consisting of metals, ceramics, and carbon fiber, and
the annular plate member being formed of an annular base plate including the plurality of through holes formed therein.

Invention I provides a gas generator for a restraining device of a vehicle, including:
a housing being made of a resin, forming an outer shell container, and having a plurality of gas discharge ports,
an ignition device disposed inside the housing,
a gas generating agent that is ignited and burned by activation of the ignition device,
each of the plurality of gas discharge ports being formed by each of a plurality of ring members that are embedded in a circumferential wall of the housing and which are formed of a material selected from the group consisting of metals, ceramics, and carbon fiber, and
the each of the ring members being embedded such that an annular surface at one end thereof is exposed from an inner wall surface of the housing and an annular surface at the other end thereof is directed to an outer side of the housing.

Invention III provides a gas generator for a restraining device of a vehicle, including:
a housing being made of a metal, forming an outer shell container, and having a plurality of gas discharge ports,
an ignition device disposed inside the housing,
a gas generating agent that is ignited and burned by activation of the ignition device,
a cylindrical member made of a resin, having a plurality of gas passage holes for discharging a combustion gas, being disposed in the housing to form a combustion chamber storing the gas generating agent,
each of the plurality of gas passage holes being formed by each of a plurality of ring members that are embedded in a circumferential wall of the cylindrical member and made of a material selected from the group consisting of metals, ceramics, and carbon fiber, and
the each of the ring members being provided such that an annular surface at one end thereof is exposed from the inner wall surface of the cylindrical member, an annular surface at the other end thereof is fixed to be directed to the outside of the cylindrical member.

Invention IV provides a gas generator for a restraining device of a vehicle, including:
a housing forming an outer shell container, having a plurality of gas discharge ports,
an ignition device disposed inside the housing,
a gas generating agent that is ignited and burned by activation of the ignition device,
a cylindrical member, having a plurality of gas passage holes for discharging a combustion gas and being disposed in the housing to form a combustion chamber storing the gas generating agent,
each of the gas passage holes being formed in combination with each of a plurality of through holes of an annular plate member that is embedded in a circumferential wall of the cylindrical member and formed of a material selected from the group consisting of metals, ceramics, and carbon fiber, and
the annular plate member being formed of an annular base plate including the plurality of through holes, each of which is formed separately from other holes.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

Figure 1:
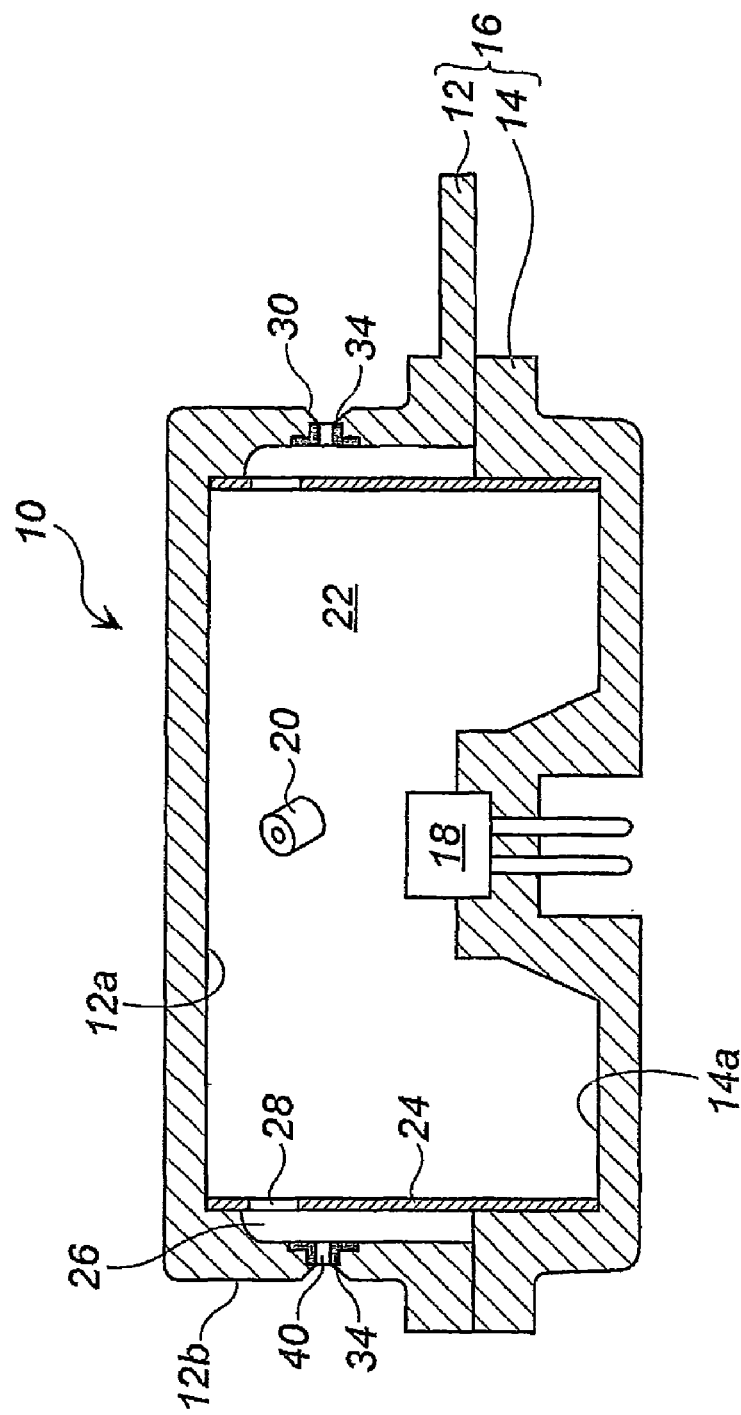
FIG. 1 shows an axial (vertical) sectional view of the gas generator in accordance with the present invention.

The present invention provides a gas generator that is reduced in weight by using structural components made of resin, but in which gas discharge ports are prevented from being melted and damaged during activation and the output performance is stable.

In the gas generator of the present invention, the gas discharge port adjusts the gas discharge amount per unit time or the combustion pressure inside the housing during activation. Therefore, the combustion gas flow velocity attains a maximum in the gas discharge port. As a result, the resin in the gas discharge port portion receives the heat generated during combustion and pressure created by the gas and can be melting damaged. Where the melting damage occurs, the opening area is changed and a stable output is difficult to maintain.

In accordance with the present invention, the gas discharge port is formed by a ring member made of a material selected from metals such as stainless steel and iron, ceramics, and carbon fiber (referred to hereinbelow as "made of a metal or the like"). As a result, the aforementioned melting damage can be prevented and therefore a stable output can be maintained.

The ring member is embedded (fixed in the embedded state) in the housing wall surface by injecting and molding a resin, together with the ring member, to form a housing.

A ring member in which a concave portion and/or a convex portion are formed on the circumferential surface can be also used to increase a engaging strength with the resin.

The annular end surface of the ring member is exposed from the inner wall surface of the housing to prevent the surrounding resin from melting damage. In the case that part of the annular end surface is covered with resin by the injection molding, it is preferable to provide the resin to the degree such that the resin covering the annular surface is instantaneously melted during activation and the annular end surface is exposed.

Examples of resins that can be used for the housing include a resin disclosed in JP-A No. 2003-161599, a resin disclosed in US-A No. 2007/0248511, and a resin disclosed in U.S. Pat. No. 6,056,319. Further, examples of resins may include PA (polyamide) 6-6, PA 6-12, PA 4-6, PA 6T, PA 9T, PPA (polyphthalamide), PPS (polyphenylene sulfide), PBT (polybutylene terephthalate), PEEK (polyethyl ethyl ketone), and LCP (liquid crystal polymers).

In the invention I, it is preferable that
the ring member includes a larger-diameter portion and a smaller-diameter portion that are concentrically arranged and also includes a central hole that passes through central portions of the larger-diameter portion and the smaller-diameter portion, and the larger-diameter portion and the smaller-diameter portion are embedded partially, an annular end surface of the larger-diameter portion is exposed from the inner wall surface of the housing, a distal end surface of the smaller-diameter portion recedes from the outer wall surface of the housing, and the central hole of the ring member forms a gas discharge port.

When the high-temperature combustion gas moves toward the gas discharge ports, the flow velocity of the gas increases at the circumferential edge of the opening of the central hole (gas discharge port) which is the inlet of the combustion gas. Therefore probability of the melting damage will increase. Accordingly, the melting damage prevention effect can be enhanced by exposing the annular end surface of the larger-diameter portion of the ring member (that is, the annular end portion with increased surface area) from the inside of the housing. Further, the ring member can be prevented from being pushed out to the outside under the effect of pressure generated inside the housing by the stopper action produced by the larger-diameter portion itself.

Since the ring member is embedded in the resin, the ring member and the resin are in close contact with each other. Therefore, the larger-diameter portion and the smaller-diameter portion may be of uniform diameter, but the uniformity of the diameter is not a necessary condition, and the diameter may continuously or discontinuously change from the larger-diameter portion towards the smaller-diameter portion.

In the invention I, it is preferable that
the ring member includes a larger-diameter portion and a smaller-diameter portion that are concentrically arranged and also includes a through hole that passes through central portions of the larger-diameter portion and the smaller-diameter portion, the larger-diameter portion and the smaller-diameter portion are embedded partially, and a sloping hole portion is formed at a tip of a distal end surface of the smaller-diameter portion, and the sloping hole portion includes an inner diameter that increases toward an outer wall surface of the housing.

According to this embodiment, a sloping hole portion formed with a sloping surface (that is, a sloping surface that expands like a horn) that expands towards the outer wall surface of the housing is positioned at the tip of the central hole of the ring member. Therefore, the flow velocity of the gas that has passed, with a high velocity, through the central hole of the ring member made of a metal or the like decreases in the sloping hole portion due to the increased opening area, and the melting damage prevention effect with respect to the outer wall surface of the housing is enhanced around the central hole of the ring member.

The annular plate member in accordance with the present invention is such that the plurality of ring members of Invention I are combined as an unified member, and the operation effect obtained is similar to that obtained with the ring members. By using the annular plate member, it is possible to facilitate the assembling operation (embedding operation of the annular plate member) by injection molding, by comparison with the case in which a plurality of ring members are used.

In the above-invention II, it is preferable that
the annular plate member includes an inner side annular base plate, an outer side annular base plate that is formed on the inner side annular base plate and has a smaller width, and a plurality of through holes formed in the inner side annular base plate and the outer side annular base plate, the plurality of gas discharge ports are combination of a plurality of openings formed in the circumferential wall surface of the housing and the through holes of the annular plate member, and the annular plate member is embedded so that the each center of the through holes coincides with each center of the openings.

The annular plate member in accordance with the present invention is a unified member obtained by combining the plurality of ring members of Invention I, having the larger-diameter portion and the smaller-diameter portion, and the operation effect obtained is similar to that obtained with the ring members. In this case, the outer side annular base plate corresponds to the smaller-diameter portion, and the inner side annular base plate corresponds to the larger-diameter portion. By using such annular plate member, it is possible to facilitate the assembling operation (embedding operation of the annular plate member) by injection molding, by comparison with the case in which a plurality of ring members are used.

In accordance with the invention III, a cylindrical member for defining a combustion chamber is disposed inside the housing. Since the cylindrical member forms the combustion chamber, it is disposed so that an opening at one end thereof abuts against the top surface of the housing and an opening at the other end abuts against the bottom surface of the housing so as to separate the inside and the outside of the combustion chamber. The cylindrical member can be formed from a resin identical to that of the housing according to the above-mentioned gas generator. In accordance with the present invention, with the ring member that is identical to what is explained so far and embedded in the circumferential wall of the cylindrical member, it is possible to obtain the operation effect identical to what is stated in the foregoing. The material selected from metals, ceramics, and carbon fiber will be referred to hereinafter as "made of a metal or the like".

In the invention III, it is preferable that the ring member includes a larger-diameter portion and a smaller-diameter portion that are concentrically arranged and also includes a central hole that passes through the central portions of the larger-diameter portion and the smaller-diameter portion, and the larger-diameter portion and smaller-diameter portion are embedded partially, a distal end surface of the smaller-diameter portion is positioned in a state to recede from the outer wall surface of the cylindrical member, and a central hole of the ring member forms a gas passage hole.

In the present invention, with the ring member that is identical to the above mentioned invention II, embedded in the circumferential wall of the cylindrical member, it is possible to obtain the operation effect identical to that of the invention stated in the foregoing.

In the invention III, it is preferable that the ring member includes a larger-diameter portion and a smaller-diameter portion that are concentrically arranged and also includes a central hole that passes through the central portions of the larger-diameter portion and the smaller-diameter portion, the larger-diameter portion and the smaller-diameter portion are embedded partially, and a sloping hole portion is formed at an tip of a distal end surface of the smaller-diameter portion, and the sloping hole portion includes an inner diameter that increases toward the outer wall surface of the cylindrical member.

With the ring member that is identical to that of the invention I, embedded in the circumferential wall of the cylindrical member, it is possible to obtain the operation effect identical to that of the invention I.

In accordance with Invention IV, with the annular plate member that is identical to that of the invention II, embedded in the circumferential wall of the cylindrical member, it is possible to obtain the operation effect identical to that of the invention stated in the foregoing.

Further in the invention IV, it is preferable that the annular plate member, fixed to the inner circumferential surface of the cylindrical member, includes an inner side annular base plate, an outer side annular base plate that is formed on the inner side annular base plate and has a smaller width, and a plurality of through holes formed in the inner side annular base plate and the outer side annular base plate, the plurality of gas passage holes are combination of a plurality of openings formed in the circumferential wall surface of the cylindrical member and the through holes of the annular plate member, and the annular plate member is embedded so that the centers of the through holes and the openings coincide with each other.

In the present invention, with the annular plate member that is identical to that of the invention II embedded in the circumferential wall of the cylindrical member, it is possible to obtain the operation effect identical to that of Invention II.

With the gas generator in accordance with the present invention, the processing and assembling of parts are facilitated and the parts where the gas discharge ports are formed and the zones surrounding the gas discharge ports are protected from the effect of heat, thereby making it possible to stabilize the output performance.

The gas generator in accordance with the present invention can be used in an airbag system designed to protect a vehicle occupant, or to an airbag for pedestrian protection that is mounted to the outer side of the vehicle.

EMBODIMENTS OF THE INVENTION (1) Gas Generator Shown in FIG. 1 to FIG. 4

FIG. 1 is an axial sectional view of a gas generator 10 in accordance with the present invention.

A housing 16 of the gas generator 10 is obtained by joining and integrating a diffuser shell 12 and a closure shell 14, which are made of resin.

A cylindrical member 24 is disposed inside the housing 16. The cylindrical member 24 is so disposed that an opening at one end thereof abuts against a top plate 12a, a circumferential wall at the side of the opening at the one end abuts against part of an inner wall surface of the diffuser shell 12. And an opening at the other end of the cylindrical member 24 abuts against a bottom plate 14a, and a circumferential wall at the side of the opening at the other end abuts against part of an inner wall surface of the closure shell 14. The inner space of the cylindrical member 24 serves as a combustion chamber 22, and a known igniter 18 and a known gas generating agent 20 are accommodated therein.

In the cylindrical member 24, a plurality of gas passage holes 28 are formed with equal intervals in the circumferential direction near the top plate 12a. A cylindrical gap 26 is formed on the outer side of the cylindrical member 24.

Figure 2:
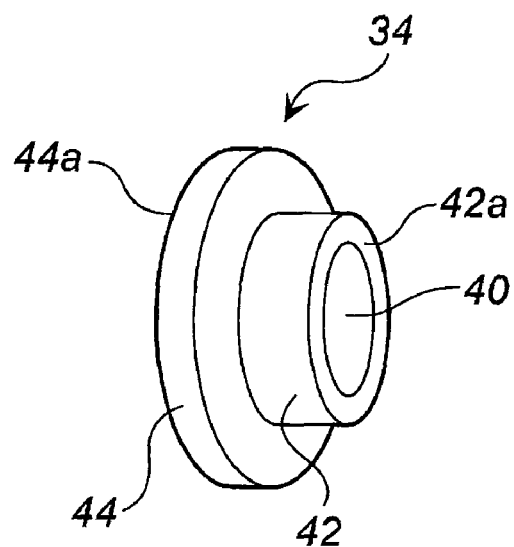
FIG. 2 shows a perspective view of the ring member shown in FIG. 1.
Figure 3:
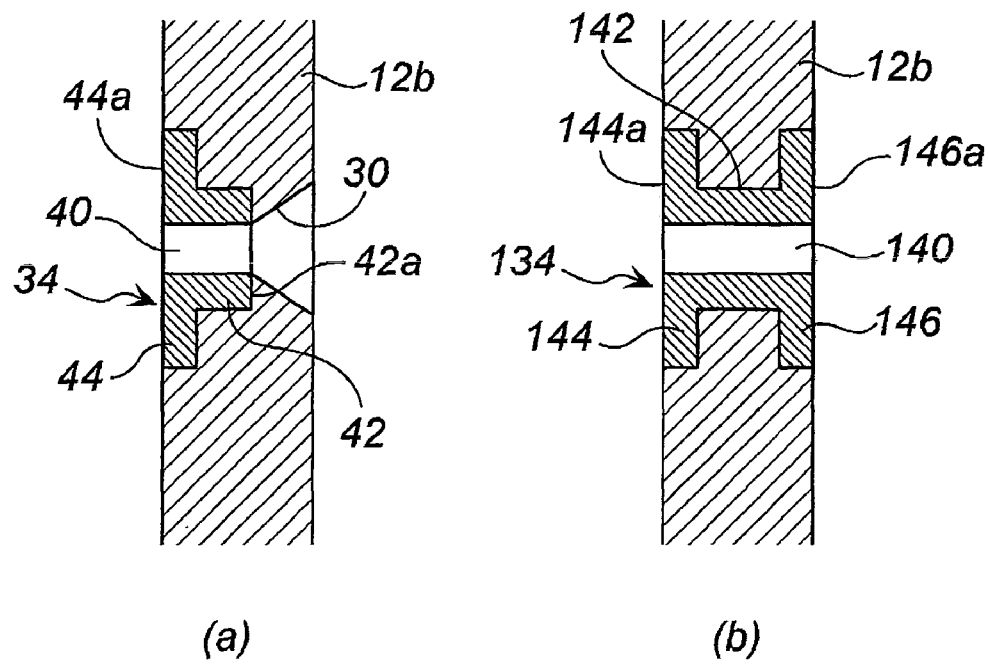
FIG. 3(*a*) shows an enlarged view of the portion including the ring member shown in FIG. 1, and FIG. 3(*b*) shows an enlarged view of the portion including the ring member of another embodiment.

A ring member 34 of a shape shown in FIG. 2 is embedded in a state shown in FIG. 3(a) in a circumferential wall 12b of the diffuser shell 12.

The ring member 34 has a larger-diameter portion 44, a smaller-diameter portion 42 and a central hole 40 that passes through these portions. The circumferential surfaces of the larger-diameter portion 44 and the smaller-diameter portion 42 are embedded in the circumferential wall 12b. The central holes 40 of the ring members 34 and the gas passage holes 28 do not face each other.

An annular end surface 44a of the larger-diameter portion is in a state of being exposed to the inner side of the housing 16. The central hole 40 is closed by a seal tape (not shown in the drawing) from the annular end surface 44a side to maintain moisture-proof property.

The distal end surface (annular end surface) 42a of the smaller-diameter portion 42 is fixed in a state in which it recedes from the surface of the circumferential wall 12b), and a sloping hole portion 30 is formed in front of the distal end surface 42a. The sloping hole portion 30 is formed of a sloping surface that expands towards the outer side of the housing 16.

A ring member 134 such as shown in FIG. 3(b) can be used instead of the ring member 34 shown in FIG. 2 and FIG. 3(a).

The ring member 134 includes a first larger-diameter portion 144, a smaller-diameter portion 142, and a second larger-diameter portion 146 and also has a central hole 140 that passes through these portions. The circumferential surfaces of the first larger-diameter portion 144, the smaller-diameter portion 142, and the second larger-diameter portion 146 are embedded in the circumferential wall 12b, but a first annular end surface 144a of the first larger-diameter portion 144 is exposed to the inner side of the housing 16 and a second annular end surface 146a of the second larger-diameter portion 146 is exposed to the outer side of the housing 16. The central hole 140 is closed by a seal tape (not shown in the drawing) in order to maintain moisture-proof property from the first annular end surface 144a.

Figure 4:
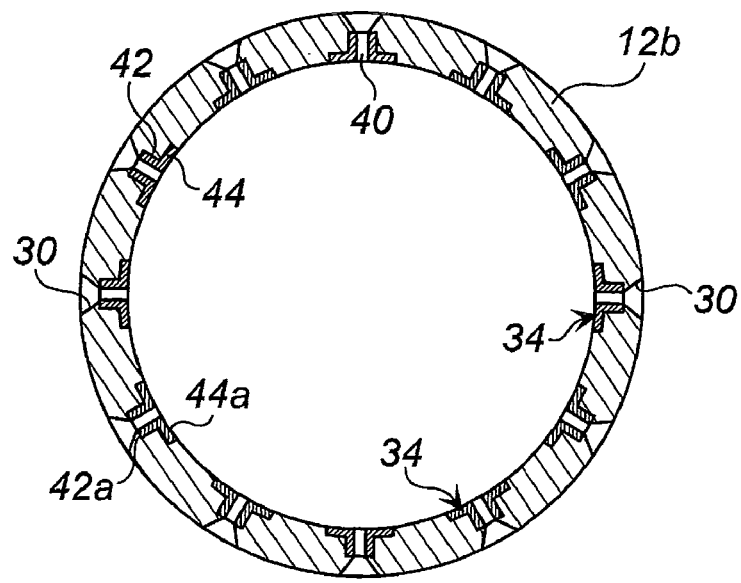
FIG. 4 shows a partial sectional view in the transverse direction that includes an attachment portion of the ring member shown in FIG. 1.

As the state shown in FIG. 4, a total of twelve ring members 34 are embedded with equal intervals in the circumferential diction in the entire circumferential wall 12b of the diffuser shell 12. The diffuser shell 12 with the twelve ring members 34 embedded therein can be produced by using a known injection-molding method.

In the gas generator 10 shown in FIG. 1, the central holes 40 of the twelve ring members 34 serve as gas discharge ports 40 and the total opening area of the gas discharge ports (central holes) 40 is set to be less than the total opening area of the gas passage holes 28 formed in the cylindrical member 24. Therefore, the maximum inner pressure of the housing 16 (combustion chamber 22) and the gas discharge amount per unit time is adjusted by the gas discharge ports (central holes) 40.

The present invention is applicable to a gas generator not only of a single type that has a single igniter (shown in FIG. 1), but also of a dual type that uses two igniters. Further, a filter or coolant may be disposed inside the gas generator 10 shown in FIG. 1. In this case, preferably, a material having a thermally insulating function is inserted between the resin and the filter or coolant to prevent the heat accumulated in the filter or coolant from being transferred to the resin after activation.

In the gas generator 10, when a sensor (not shown in the drawing) senses the impact of collision, an activation signal is sent to the igniter 18, the igniter 18 is activated, and the gas generating agent 20 is ignited. The gas generating agent 20 burns, and the high-temperature and high-pressure combustion gas is generated and flows into the gap 26 from the gas passage holes 28 of the cylindrical member 24. The seal tape closing the gas discharge ports (central holes) 40 is ruptured and the gas is discharged to the outside of the housing 16.

When the combustion gas flows from the gap 26 into the gas discharge ports (central holes) 40 in the combustion gas discharge process, the gas flow is concentrated in the gas discharge ports 40. As a result, the flow velocity of the combustion gas rises. In particular, because the high-temperature combustion gas is concentrated, the gas discharge ports 40 and the resin surrounding them, in the inner circumferential surface of the circumferential wall 12b, are exposed to severe thermal conditions. As a result, melting damage easily occurs. However, because the ring members 34 made of a metal or the like are used, heat resistance is enhanced in the portion where the gas flow velocity increases. As a result, no melting damage occurs and the diameter of the gas discharge ports 40 is not changed. Therefore, the pressure in the combustion chamber 22 and the output performance of the gas generator 10 are stabilized.

The sloping hole portion 30 that is continuous with the gas discharge port (central hole) 40 has a horn-like expanding shape, as shown in FIG. 3(a). Therefore, the flow velocity of the combustion gas that has passed through the gas discharge port (central hole) 40 decreases. As a result, the sloping hole portion 30 and the surrounding resin can be prevented from melting damage.

Since the larger-diameter portion 44 is present, as shown in FIG. 3(a), the surface area of the resin in the inner circumferential surface of the circumferential wall 12b is enlarged for being protected from melting damage. Furthermore, the ring member 34 is also prevented from being pushed out to the outside of the housing 16 by the pressure generated inside the housing 16.

When the ring member 134 shown in FIG. 3(b) is used instead of the ring member 34 shown in FIG. 3(a), heat resistance in the outer circumferential surface of the circumferential wall 12b where the gas discharge ports (central holes) 140 are provided is increased and the melting damage prevention effect is enhanced. In addition, the fixing strength of the ring member 34 is also increased.

Figure 5:
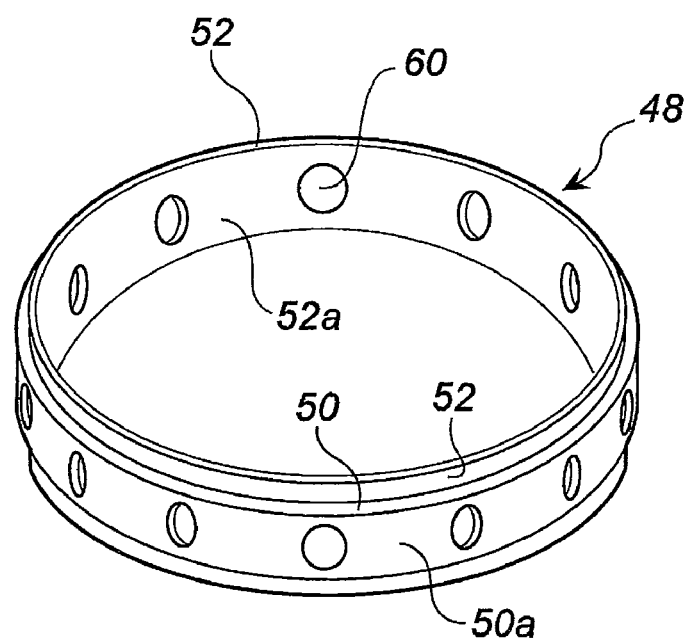
FIG. 5 shows a perspective view of the annular plate member used instead of the ring member shown in FIG. 1.
Figure 6:
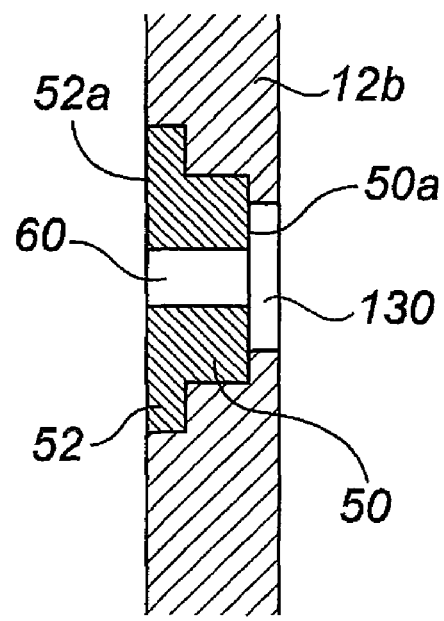
FIG. 6 shows a partial sectional view in the axial direction that includes an attachment portion of the annular plate member shown in FIG. 5.
Figure 7:
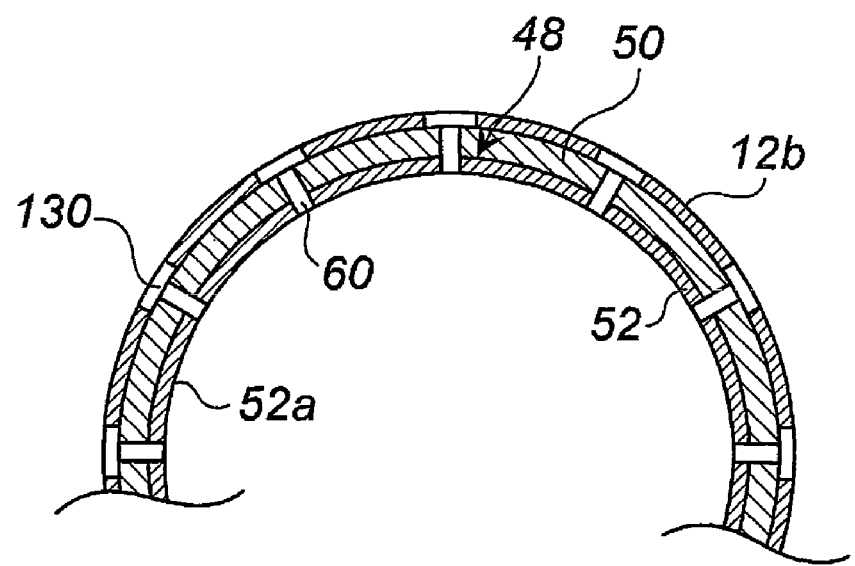
FIG. 7 shows a partial sectional view in the transverse direction that includes an attachment portion of the annular plate member shown in FIG. 5.

(2) Gas Generator Shown in FIG. 5 to FIG. 7

An annular plate member 48 in FIG. 5, which is made of stainless steel or the like, is obtained by combining together, as a unified member, the plurality of ring members 34 shown in FIG. 2. This annular plate member 48 is embedded in a state shown in FIG. 4.

The annular plate member 48 includes an inner side annular base plate 52 that is positioned in the inside of the housing 16 when the annular plate member is embedded in the circumferential wall 12b, an outer side annular base plate 50 positioned in the outside, and a total of twelve through holes 60 formed through the inner side annular base plate 52 and the outer side annular base plate 50. The width of the inner side annular base plate 52 is larger than the width of the outer side annular base plate 50.

In the annular plate member 48, as shown in FIG. 6, the circumferential surfaces of the inner side annular base plate 52 and the outer side annular base plate 50 and part (portion close to the outer periphery) of an outside annular end surface 50a of the outer side annular base plate 50 are embedded in the circumferential wall 12b of the diffuser shell.

As shown in FIG. 7, the annular plate member 48 is embedded so that the centers of the twelve through holes 60 coincide with the centers of twelve openings 130 formed in the circumferential wall 12b of the diffuser shell. In this case, the through holes 60 correspond to the central holes 40 of the ring members 34 (that is, gas discharge ports), and the openings 130 correspond to the sloping hole portions 30 (see FIG. 3(a)).

An inside annular end surface 52a of the inner side annular base plate 52 are exposed to the inside of the housing 16, and part of an outside annular end surface 50a of the outer side annular base plate 50 is exposed to the side of the opening 130. The diameter of the opening 130 is greater that the diameter of the through hole 60. The through hole 60 is closed by a seal tape (not shown in the drawing) from the inside annular end surface 52a.

The gas generator using the annular plate member 48 shown in FIG. 5 operates similarly to the gas generator shown in FIG. 1. The igniter 18 is activated, the gas generating agent 20 is ignited, and the high-temperature and high-pressure combustion gas is generated and flows from the gas passage holes 28 of the cylindrical member 24 into the gap 26. The seal tape closing the gas discharge ports (through holes) 60 is then ruptured and the gas is discharged to the outside of the housing 16.

When the combustion gas flows from the gap 26 to the gas discharge ports (through holes) 60 in the combustion gas discharge process, the gas flow is concentrated in the gas discharge ports (through holes) 60. As a result, the flow velocity of the combustion gas rises. In particular, because the high-temperature combustion gas is concentrated, the gas discharge ports (through holes) 60 and the resin surrounding them, in the inner circumferential surface of the circumferential wall 12b, are exposed to severe thermal conditions. As a result, melting damage easily occurs. However, because the annular plate member 48 made of a metal or the like is used, heat resistance is enhanced in the portions where the gas flow velocity increases. As a result, no melting damage occurs and the diameter of the gas discharge ports 60 is not changed. Therefore, the pressure in the combustion chamber 22 and the output performance of the gas generator are stabilized.

The opening 130 that is continuous with the gas discharge port 60 has a larger-diameter, as shown in FIG. 6. Therefore, the flow velocity of the combustion gas that has passed through the gas discharge port 60 decreases. As a result, the opening 130 and the surrounding resin can be prevented from melting damage. The opening 130 also may be provided with a sloping surface that expands outward as the sloping hole portion 30 shown in FIG. 1 and FIG. 3.

Since the inner side annular base plate 52 is present, as shown in FIG. 6, the surface area of the resin in the inner circumferential surface of the circumferential wall 12b is enlarged for being protected from melting damage. Furthermore, the annular plate member 48 is also prevented from being pushed out to the outside of the housing 16 by the pressure generated inside the housing 16.

The annular plate member 48 has a cross-sectional shape shown in FIG. 6, but may also have a cross-sectional shape identical or similar to that shown in FIG. 3(b).

Figure 8:
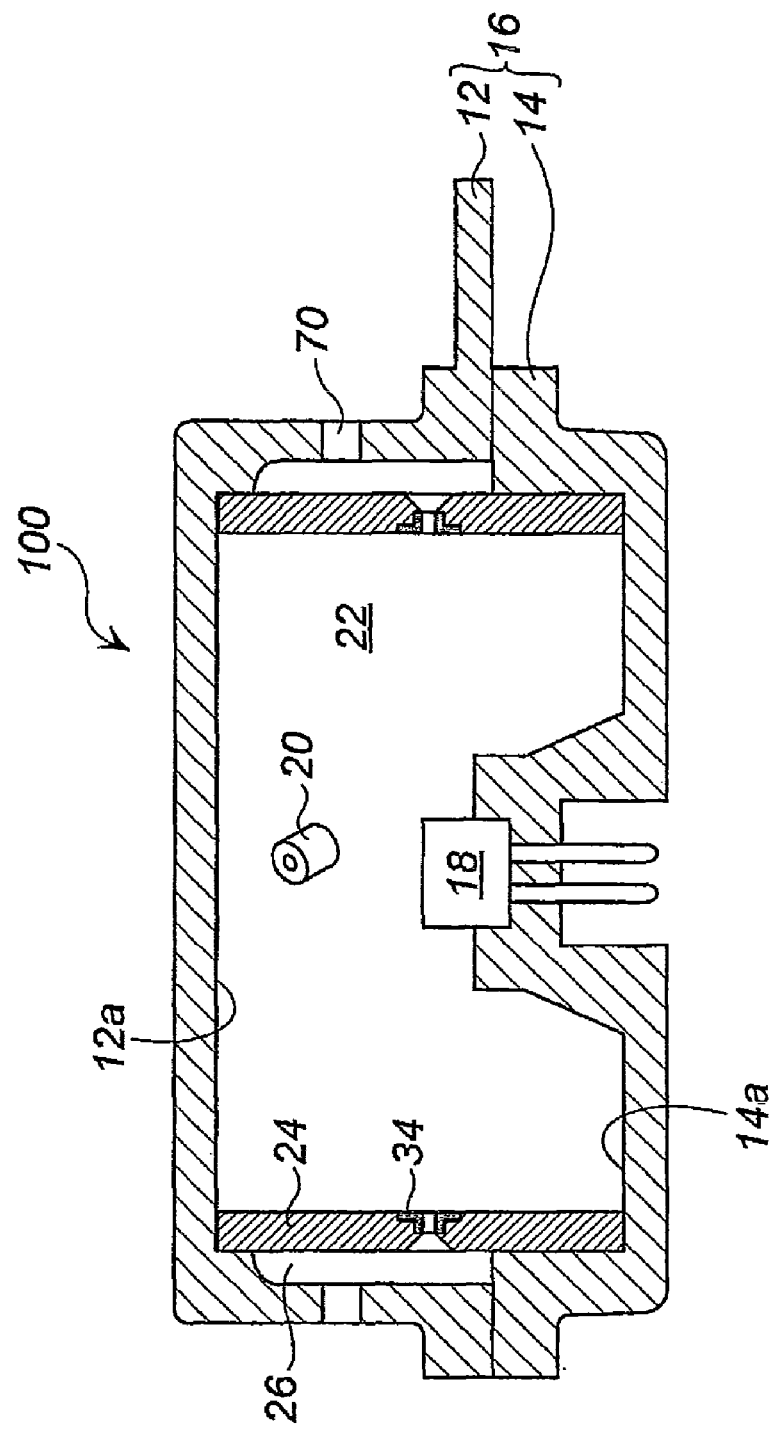
FIG. 8 is an axial sectional view of the gas generator of another embodiment.

(3) Gas Generator Shown in FIG. 8

A gas generator 100 shown in FIG. 8 differs from the gas generator 10 shown in FIG. 1 in that the ring member 34 is attached to the cylindrical member 24, the housing 16 is made from a metal (stainless steel, aluminum, or the like), and the cylindrical member 24 is made from a resin.

The attachment state of the ring member 34 to the cylindrical member 24 is identical to that shown in FIG. 3(a) and FIG. 4. Further, the ring member 134 such as shown in FIG. 3(b) can be also used. The central holes 40, 140 of the ring members 34, 134 correspond to the gas passage holes 28 shown in FIG. 1.

Further, the annular plate member 48 shown in FIG. 5 can be also used and embedded as shown in FIG. 6 and FIG. 7. In this case, the through holes 60 of the annular plate member 48 correspond to the gas passage holes 28 shown in FIG. 1.

In the gas generator 100 shown in FIG. 8, the central holes 40 of the twelve ring members 34 embedded in the cylindrical member 24 serve as gas passage holes (the gas passage holes 28 shown in FIG. 1), and the total surface area of the gas passage holes is set to be less than the total opening area of gas discharge ports 70 formed in the diffuser shell 12. Therefore, the maximum inner pressure of the housing 16 (the combustion chamber 22) and the gas discharge amount per unit time is adjusted by the gas passage holes.

In the gas generator 100 shown in FIG. 8, it is also possible to make the housing 16 from a resin and apply the ring member 40 (or the ring member 140) shown in FIG. 1 to FIG. 4 or the annular plate member 48 shown in FIG. 5 to FIG. 7 to the gas discharge ports 70.

The gas generator 100 shown in FIG. 8 is operated in the same manner as the gas generator 10 shown in FIG. 1 and the same operation effect is obtained.

The invention thus described, it will be obvious that the same way may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator for a restraining device of a vehicle, comprising:
   a housing being made of a resin, forming an outer shell container, and having a plurality of gas discharge ports that extend through the outer shell container,
   an ignition device disposed inside the housing,
   a gas generating agent that is ignited and burned by activation of the ignition device,
   each of the plurality of gas discharge ports being formed by each of a plurality of ring members that are embedded in a circumferential wall of the housing and which are formed of a material selected from the group consisting of metals, ceramics, and carbon fiber, and
   the each of the ring members being embedded such that an annular surface at one end thereof is exposed from an inner wall surface of the housing and an annular surface at the other end thereof is directed to an outer side of the housing.

2. The gas generator for a restraining device of a vehicle according to claim 1, wherein
   the ring member comprises a larger-diameter portion and a smaller-diameter portion that are concentrically arranged and also comprises a central hole that passes through central portions of the larger-diameter portion and the smaller-diameter portion, and
   the larger-diameter portion and the smaller-diameter portion are embedded partially, an annular end surface of the larger-diameter portion is exposed from the inner wall surface side of the housing, a distal end surface of the smaller-diameter portion recedes from the outer wall surface of the housing, and the central hole of the ring member forms a gas discharge port.

3. The gas generator for a restraining device of a vehicle according to claim 1, wherein
   the ring member comprises a larger-diameter portion and a smaller-diameter portion that are concentrically arranged and also comprises a through hole that passes through central portions of the larger-diameter portion and the smaller-diameter portion,
   the larger-diameter portion and the smaller-diameter portion are embedded partially, and a sloping hole portion is formed at a tip of a distal end surface of the smaller-diameter portion, and
   the sloping hole portion includes an inner diameter that increases toward an outer wall surface of the housing.

* * * * *